United States Patent
Kawano

(10) Patent No.: US 9,661,245 B2
(45) Date of Patent: May 23, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Atsushi Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/692,634

(22) Filed: Apr. 21, 2015

(65) Prior Publication Data
US 2015/0312498 A1    Oct. 29, 2015

(30) Foreign Application Priority Data

Apr. 28, 2014 (JP) .................................. 2014-092540

(51) Int. Cl.
| | |
|---|---|
| H04N 5/225 | (2006.01) |
| H04N 5/357 | (2011.01) |
| G06K 9/00 | (2006.01) |
| H04N 5/232 | (2006.01) |

(52) U.S. Cl.
CPC ....... *H04N 5/3572* (2013.01); *G06K 9/00369* (2013.01); *G06K 9/00711* (2013.01); *H04N 5/23238* (2013.01)

(58) Field of Classification Search
CPC .................................................. H04N 5/23238
USPC ................................. 348/36, 240.99, 207.11
See application file for complete search history.

(56) References Cited

U.S. PATENT DOCUMENTS

| | | | | |
|---|---|---|---|---|
| 2006/0274164 A1* | 12/2006 | Kimura | .................... | H04N 5/77 348/231.3 |
| 2009/0207269 A1 | 8/2009 | Yoda | | |
| 2011/0249153 A1* | 10/2011 | Hirooka | .................... | B60R 1/00 348/241 |
| 2012/0076205 A1* | 3/2012 | Segall | .................... | H04N 9/045 375/240.12 |
| 2012/0249725 A1* | 10/2012 | Corcoran | .............. | G06T 3/0062 348/36 |
| 2013/0293672 A1 | 11/2013 | Suzuki | | |

FOREIGN PATENT DOCUMENTS

| | | |
|---|---|---|
| JP | 2012-141972 A | 7/2012 |
| JP | 2013-9050 A | 1/2013 |

* cited by examiner

*Primary Examiner* — Anthony J Daniels
(74) *Attorney, Agent, or Firm* — Canon U.S.A., Inc. IP Division

(57) ABSTRACT

An image processing apparatus includes a processing unit configured to perform predetermined detection processing on image data captured with use of an imaging unit for wide-angle imaging, a determination unit configured to determine whether to transmit geometrically converted image data generated by performing a geometric conversion on the captured image data to a reception apparatus, or to transmit the captured image data, without the geometric conversion, to the reception apparatus, and a control unit configured to perform control for performing the geometric conversion on a result of the predetermined detection processing performed on the captured image data without the geometric conversion, in a case where it is determined that the geometrically converted captured image data is to be transmitted to the reception apparatus.

14 Claims, 7 Drawing Sheets

FIG. 2

| CIRCULAR IMAGE | FULL PANORAMIC DEWARPING | PARTIAL PANORAMIC DEWARPING | PARTIAL SEGMENTING DEWARPING | DEWARPING FOR HUMAN BODY PROCESSING |
|---|---|---|---|---|
| ... | ... | ... | ... | ... |
| 100, 20 | 120, 10 | 60, 8 | 120, 10 | 120, 14 |
| 101, 20 | 121, 10 | 61, 8 | 121, 10 | 121, 14 |
| ... | ... | ... | ... | ... |
| $x, y$ | $x', y'$ | $x'', y''$ | $x''', y'''$ | $x'''', y''''$ |
| ... | ... | ... | ... | ... |

FIG. 3
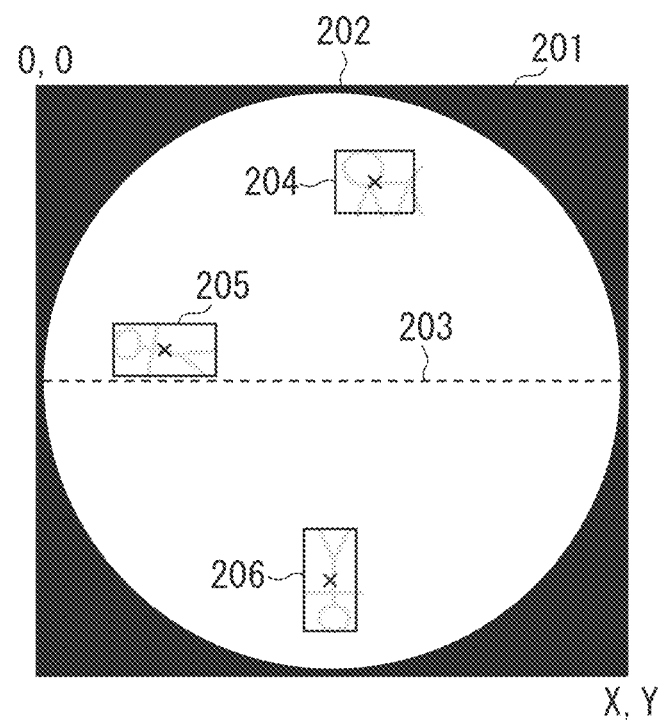
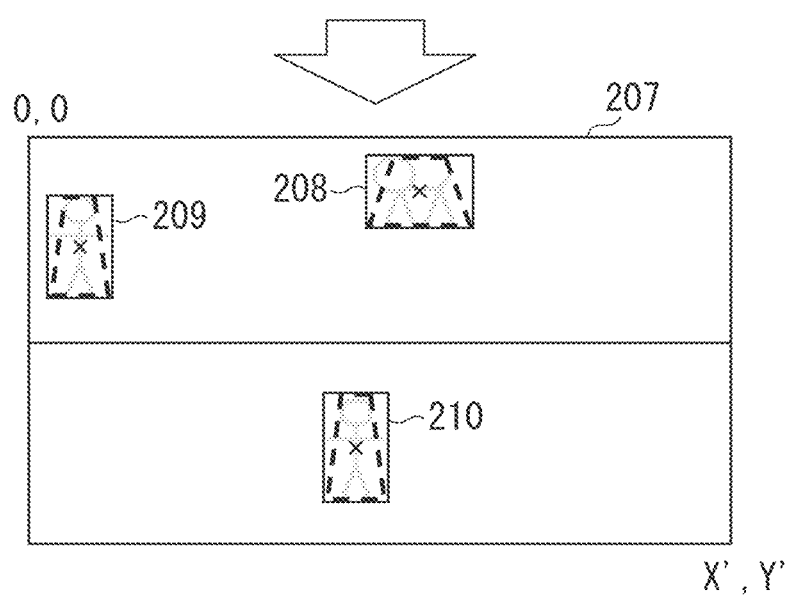

IMAGE PROCESSING APPARATUS, IMAGE PROCESSING METHOD, AND STORAGE MEDIUM

BACKGROUND OF THE INVENTION

Field of the Invention

The present invention relates to a technique for transmitting a result of predetermined detection processing performed on image data.

Description of the Related Art

There is known a method for imaging a wide range with use of a wide-range imaging apparatus, such as a fish-eye lens and an omnidirectional mirror compared to imaging with use of an imaging apparatus that images a normal angle of view. An image captured by such a wide-range imaging apparatus (a wide-range image) is characterized in that an effective portion thereof is circular. Further, the wide-range image is characterized in that an object image is distorted in an image, and a direction of the object (for example, a direction from a foot to a head) is different depending on a position in the image, according to a positional relationship between the wide-range imaging apparatus and the object.

Further, it is known to detect and recognize an object, a human body, a face, and the like from an image. Furthermore, it is known to recognize an object after correcting the wide-range image, to employ an object recognition technique on the wide-range image. Japanese Patent Application Laid-Open No. 2012-141972 discusses a technique in which dewarping (processing for correcting a geometric distortion due to a wide-angle lens, such as the fish-eye lens) is performed on the wide-range image when an object is detected from the wide-range image. Further, Japanese Patent Application Laid-Open No. 2013-9050 discusses a technique in which a moving object is detected from a wide-range image, and the dewarping is performed on a region from which the moving object is detected, and then a human figure and a face are detected.

In a case where a result of the above-described processing is transmitted to a reception apparatus together with the image, the image and the result of the processing performed on the image that are received by the reception apparatus may not correspond to each other. More specifically, in a case where the reception apparatus (a monitoring apparatus) requests a wide-range image to the wide-range imaging apparatus, the wide-range imaging apparatus may transmit the wide-range image and a result of the detection processing performed on a dewarped image of the wide-range image to the reception apparatus. In such a case, the image and the result of the detection processing that are received by the reception apparatus do not correspond to each other.

Further, in a case where the reception apparatus requests a dewarped image to the wide-range imaging apparatus, the wide-range imaging apparatus may transmit the dewarped image and a result of the detection processing performed on the wide-range image to the reception apparatus. Also, in such a case, the image and the result of the detection processing that are received by the reception apparatus do not correspond to each other.

SUMMARY OF THE INVENTION

According to an aspect of the present invention, an image processing apparatus includes a processing unit configured to perform predetermined detection processing on image data captured with use of an imaging unit for wide-angle imaging, a determination unit configured to determine whether to transmit geometrically converted image data generated by performing a geometric conversion on the captured image data to a reception apparatus, or to transmit the captured image data, without the geometric conversion, to the reception apparatus, and a control unit configured to perform control for performing the geometric conversion on a result of the predetermined detection processing performed on the captured image data without the geometric conversion, in a case where it is determined that the geometrically converted captured image data is to be transmitted to the reception apparatus.

Further features of the present invention will become apparent from the following description of exemplary embodiments (with reference to the attached drawings).

BRIEF DESCRIPTION OF THE DRAWINGS

FIG. 2 is a diagram illustrating an example of a coordinate correspondence table.

FIG. 3 is a diagram illustrating an example of a conversion of information about a moving object.

DESCRIPTION OF THE EMBODIMENTS

In the following description, exemplary embodiments of the present invention will be described in detail with reference to the attached drawings. Configurations according to the exemplary embodiments, which will be described below, are mere examples, and the present invention is not limited to the illustrated configurations.

An image processing apparatus according to a first exemplary embodiment will be described below. The present exemplary embodiment will be described mainly on an example in which the image processing apparatus is a wide-range imaging apparatus that includes a fish-eye lens, and performs processing for detecting a moving object and a human body from a wide-range image and processing for tracking the moving object and the human body to then transmit image data (hereinafter referred to as an image) and results of the processing. However, the image processing apparatus does not necessarily have to include an imaging unit, and may be configured to acquire a wide-range image from a wide-range imaging apparatus.

Figure 1:
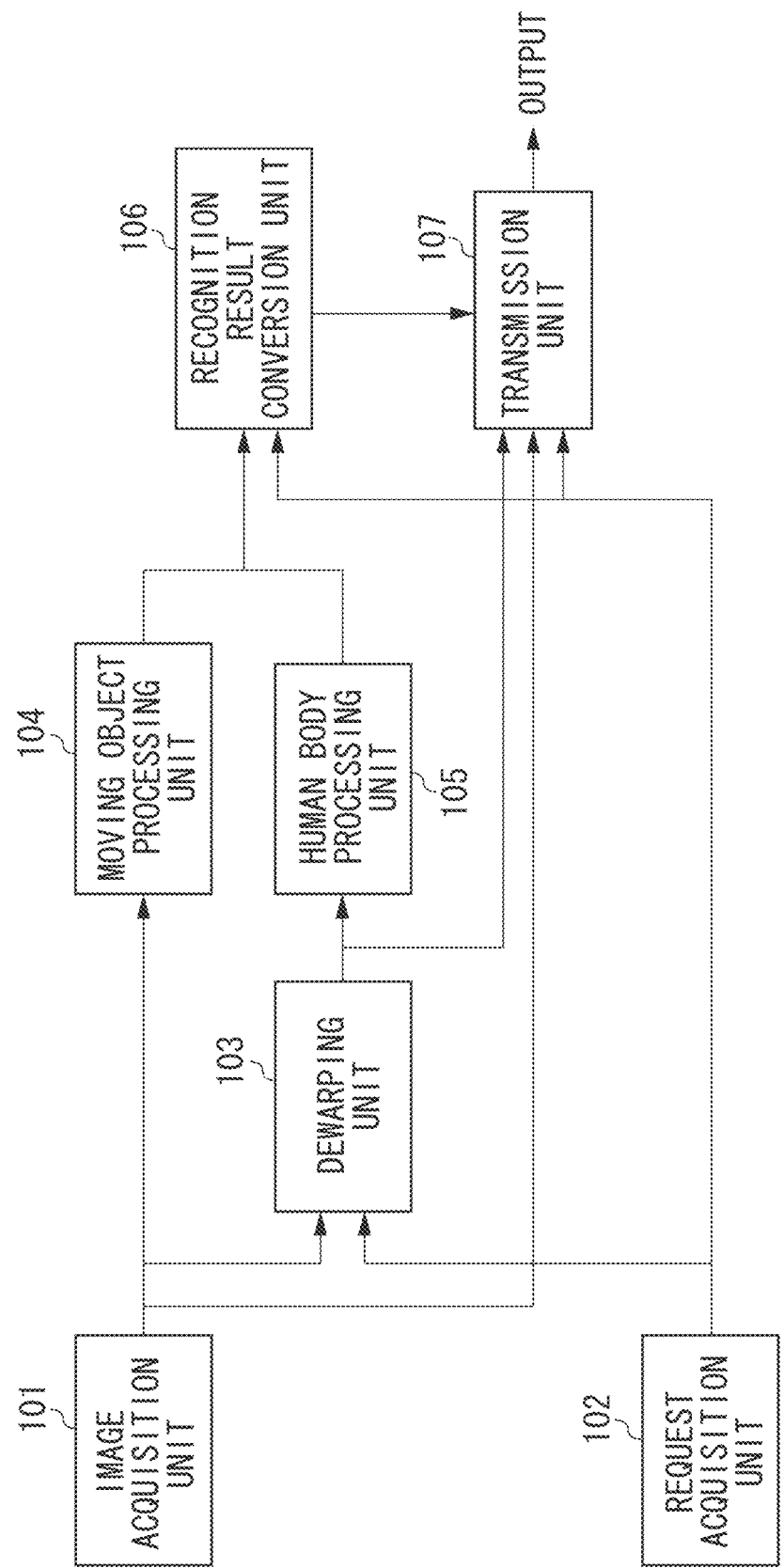
FIG. 1 is a block diagram illustrating a configuration of a wide-range imaging apparatus according to an exemplary embodiment.

FIG. 1 is a block diagram illustrating a configuration of an image processing apparatus that is an example according to the exemplary embodiment of the present invention. The image processing apparatus includes an image acquisition unit 101, a request acquisition unit 102, a dewarping unit 103, a moving object processing unit 104, a human body processing unit 105, a recognition result conversion unit 106, and a transmission unit 107.

The image acquisition unit 101 sequentially acquires images (hereinafter referred to as input images) from an imaging unit (not illustrated) including the fish-eye lens at predetermined time intervals, and provides the input images to the dewarping unit 103, the moving object processing unit 104, and the transmission unit 107. The input image according to the present exemplary embodiment is a wide-range image, and a circular image shaped in such a manner that an imaging region thereof is approximated into a circular shape. The moving object processing unit 104 performs moving object detection and tracking processing (moving object processing) on the input image on which dewarping has not been performed by the dewarping unit 103. The human body processing unit 105 performs human body detection and tracking processing (human body processing) on the input image on which the dewarping is performed by the dewarping unit 103.

The request acquisition unit 102 acquires an image acquisition request from an external apparatus (not illustrated). The image acquisition request can include an instruction to perform the dewarping and a dewarping type. In a case where the instruction to perform the dewarping is included in the image acquisition request, the request acquisition unit 102 notifies the dewarping unit 103 of the dewarping instruction and the dewarping type, and also notifies the recognition result conversion unit 106 of an instruction to convert a result of the moving object processing and a result of the human body processing (a conversion instruction A), and the dewarping type.

In a case where the instruction to perform the dewarping is not included in the image acquisition request, the request acquisition unit 102 notifies the recognition result conversion unit 106 of an instruction to convert the result of the human body processing (a conversion instruction B). Further, the request acquisition unit 102 notifies the transmission unit 107 of the image acquisition request acquired from the external apparatus.

The external apparatus (a reception apparatus) is a display apparatus that displays the image and the results of the detection/recognition processing, and/or a recording apparatus that stores the image. However, the external apparatus is not limited to the above-described apparatuses, and may be an apparatus that receives at least one of the image and the results of the detection/recognition processing from the image processing apparatus.

In a case where the dewarping unit 103 receives the instruction to perform the dewarping from the request acquisition unit 102, the dewarping unit 103 performs the dewarping on the input image according to a specified dewarping type to generate an image which is a dewarped image of the input image (hereinafter referred to as a dewarped image A). More specifically, the dewarping unit 103 performs a predetermined geometric conversion on image data of the input image, thereby generating image data of a dewarped image A in which a geometric distortion due to the fish-eye lens is corrected. In the input image, a direction (for example, a direction from a foot to a head) of an object (for example, a human figure) is different depending on a position in the image, but the difference in the direction of the object according to the position is corrected by this predetermined geometric conversion. According to the present exemplary embodiment, an example of the dewarping type includes three types which are full panoramic dewarping, partial panoramic dewarping, and partial segmenting dewarping.

The full panoramic dewarping is realized by dividing the input image (the wide-range image) into two images of upper and lower semicircular images, and performing processing for correcting a geometric distortion due to the fish-eye lens (a geometric conversion) on each of the semicircular images. The partial panoramic dewarping is realized by dividing the input image into two images of upper and lower semicircular images, and performing the processing for correcting a geometric distortion due to the fish-eye lens on either of the semicircular images. The segmenting dewarping is realized by performing the processing for correcting a geometric distortion due to the fish-eye lens on an arbitrary rectangular region in the input image. The image processing apparatus according to the present exemplary embodiment can realize the above-described dewarping (the full panoramic dewarping, the partial panoramic dewarping, and the segmenting dewarping) by referring to a previously stored coordinate correspondence table.

FIG. 2 is a diagram illustrating an example of a coordinate correspondence table. For example, in a case where the circular image (the input image) is converted into a full panoramic dewarped image with an origin set to an upper left vertex of a rectangular image containing the wide-range image as an inscribed circle, a point (100, 20) in the circular image corresponds to a point (120, 10) in the full panoramic dewarped image. On the other hand, in a case where a partial panoramic dewarped image is converted into the circular image, a point (60, 8) in the partial panoramic dewarped image corresponds to the point (100, 20) in the circular image. In this manner, the dewarping unit 103 converts the image by referring to the coordinate correspondence table. Further, the dewarping unit 103 generates a dewarped image that the human body processing unit 105 uses in the processing for detecting a human body and processing for recognizing a human body (hereinafter referred to as a dewarped image B), with use of the coordinate correspondence table.

The dewarped image B is an image generated by correcting a geometric distortion due to the fish-eye lens in such a manner that a direction of a human object (the direction from the foot to the head) is corrected so as to extend from a lower side of the image to an upper side of the image. In other words, the dewarping unit 103 generates human body detection image data (the dewarped image B) by performing a second predetermined geometric conversion, which is different from the predetermined geometric conversion for generating the dewarped image A to be transmitted to the external apparatus (the reception apparatus), on the image data of the input image. Then, the dewarping unit 103 provides the converted image data acquired from the second predetermined geometric conversion to the human body processing unit 105.

According to the present exemplary embodiment, the three types of dewarping, which are the full panoramic dewarping, the partial panoramic dewarping, and the segmenting dewarping have been described as the dewarping type. However, the dewarping type is not limited to the above-described types. Further, the method for generating the dewarped image B (the human body detection image) to be used in the human detection is not limited to the above-described method. For example, the dewarped image B can be acquired by generating an image desirable for the detection processing according to the characteristic of the human body that should be detected.

Further, the dewarping for generating the dewarped image A (the dewarped image to be transmitted) and the dewarping for generating the dewarped image B (the dewarped image for the human body detection) may be the same dewarping. Further, the method for generating the dewarped image is not limited to the method that includes referring to the previously stored coordinate correspondence table. Another possible method is, for example, a method that includes performing a conversion calculation, such as the geometric conversion, every time an image is dewarped.

The moving object processing unit 104 detects a moving object from the input image, and performs the processing for tracking the detected moving object. The moving object processing unit 104 detects a moving object with use of the background subtraction technique, which generates a background model and detects a moving object by comparing the input image and the background model. The moving object processing unit 104 performs the moving object detection and the tracking processing on the input image on which the dewarping has not been performed by the dewarping unit 103. Information about the moving object according to the present exemplary embodiment includes central coordinates of the moving object, coordinates of a circumscribed rectangle surrounding the moving object, and an area of a region of the moving object in the input image. The central coordinates of the moving object and the coordinates of the circumscribed rectangle surrounding the moving object are used to display a central point and a circumscribed shape of the moving object in a display image, and the area of the region of the moving object is displayed in the image to allow a viewer to confirm a size of the moving object. However, the information about the moving object is not limited to the above-described information. Further, a part of the central coordinates, the circumscribed rectangle, and the area of the moving object may be displayed on the reception apparatus side.

Further, the method for detecting a moving object is not limited to the background subtraction technique, and may be any method that detects a moving object from the input image, such as a inter-frame differencing method and a moving object detection method based on a motion vector. Further, tracking the moving object is processing for associating moving objects detected from input images with each other based on a color characteristic and a positional relationship between the moving objects in the images. The moving object processing unit 104 provides an identification (ID) for identifying the moving object which is detected from the input image. Further, the moving object processing unit 104 provides the same ID as the ID provided to the moving object detected from the previous input image, to a moving object associated with the moving object detected from the previous input image by the tracking processing among moving objects detected from the input image. The processing result output from the moving object processing unit 104 will be referred to as a moving object processing result A.

The human body processing unit 105 detects a human body from the dewarped image B, and performs the processing for tracking the detected human body. The human body processing unit 105 detects a human body with use of a pattern matching processing. More specifically, the human body processing unit 105 detects a human body by comparing a human body detection image and a previously stored pattern image of a human body. The human body detection image is the converted image data generated by the geometric conversion performed by the dewarping unit 103. Information about the human body includes central coordinates of the human body, coordinates of a circumscribed rectangle surrounding the human body, and reliability of the human body in the dewarped image B. The central coordinates of the human body and the coordinates of the circumscribed rectangle surrounding the human body are used to display a central point and a circumscribed shape of the human body in the image, and the reliability is displayed in the image to allow a viewer to confirm how much the detected human body looks like a human being. However, the information about the human body is not limited to the above-described information. Further, a part of the central point, the circumscribed shape, and the reliability of the human body may be displayed on the reception apparatus side. The method for detecting a human body is not limited to the method using the pattern matching processing.

Further, tracking the human body is processing for associating human bodies detected from human body detection images with each other based on a color characteristic and a positional relationship of the human body between the images. The human body processing unit 105 provides an ID for identifying the human body which is detected from the human body detection image. Further, the human body processing unit 105 provides the same ID as the ID provided to the human body detected from the previous human body detection image, to a human body associated with the human body detected from the previous human body detection image by the tracking processing among human bodies detected from the human body detection image. The processing result output from the human body processing unit 105 will be referred to as a human body processing result A.

The recognition result conversion unit 106 performs processing for converting the processing results output from the moving object processing unit 104 and the human body processing unit 105 (the moving object processing result A and the human body processing result A) with use of a coordinate conversion table according to the instruction acquired from the request acquisition unit 102. More specifically, in a case where the image processing apparatus receives the image acquisition request including the instruction to perform the dewarping from the reception apparatus, the conversion instruction A is input into the recognition result conversion unit 106. Then, in a case where the recognition result conversion unit 106 acquires the conversion instruction A, the recognition result conversion unit 106 converts the central coordinates of the moving object, the coordinates of the circumscribed rectangle surrounding the moving object, and the area of the region of the moving object in the input image into central coordinates of the moving object, coordinates of a circumscribed rectangle surrounding the moving object, and an area of a region of the moving object in the dewarped image A according to the dewarping type. In other words, in a case where a request for the dewarped image is acquired from the external apparatus (the reception apparatus), the recognition result conversion unit 106 performs a conversion according to the predetermined geometric conversion on the result of the detection processing performed on the input image (for example, the coordinate values of the moving object). This conversion allows the result of the detection processing performed on the input image (the coordinate values of the moving object) to correspond to a result of the detection processing performed on the dewarped image A (the coordinate values of the moving object).

The circumscribed rectangle (a rectangular shape) surrounding the moving object detected from the input image is deformed into a substantially trapezoidal shape in the dewarped image A. The recognition result conversion unit 106 according to the present exemplary embodiment sets a circumscribed rectangle shaped so as to entirely contain the substantially trapezoidal shape as the circumscribed rectangle surrounding the moving object in the dewarped image A based on vertices of the substantially trapezoidal shape. A processing result generated from the conversion performed by the recognition result conversion unit 106 will be referred to as a moving object processing result B.

Further, in a case where the recognition result conversion unit 106 acquires the conversion instruction A, the recognition result conversion unit 106 converts the central coordinates of the human body and the coordinates of the circumscribed rectangle surrounding the human body in the dewarped image B (the human body detection image) into central coordinates of the human body and coordinates of a circumscribed rectangle surrounding the human body in the dewarped image A according to the dewarping type. In other words, in a case where the request for the dewarped image is acquired from the external apparatus (the reception apparatus), the recognition result conversion unit 106 performs a conversion according to the geometric conversion on the result of the detection processing performed on the dewarped image B (the human body detection image) (for example, the coordinate values of the human body). This conversion is a conversion for causing the coordinate values in the dewarped image B (the human body detection image) to correspond to the coordinate values in the dewarped image A (the image to be transmitted to the reception apparatus). This conversion allows the result of the detection processing performed on the dewarped image B (the coordinate values of the human body) to correspond to a result of the detection processing performed on the dewarped image A (the coordinate values of the human body).

The circumscribed rectangle (a rectangular shape) surrounding the human body detected from the dewarped image B is deformed into a substantially trapezoidal shape in the dewarped image A. The recognition result conversion unit 106 according to the present exemplary embodiment sets a circumscribed rectangle shaped so as to entirely contain the substantially trapezoidal shape as the circumscribed rectangle surrounding the human body in the dewarped image A based on vertices of the substantially trapezoidal shape. A processing result generated from the conversion performed by the recognition result conversion unit 106 will be referred to as a human body processing result B.

FIG. 3 is a diagram illustrating an example in which information about the moving object acquired from the moving object processing performed on the input image is converted into the information about the moving object in the dewarped image A dewarped by the full panoramic dewarping. An input image 201 is an image having an origin set to an upper left vertex of a rectangle with a circular region contained therein as an inscribed circle. Moving object regions 204, 205, and 206 each are a result of drawing central coordinates of a moving object and coordinates of a circumscribed rectangle surrounding the moving object in the input image 201. A dewarped image A 207 is an image generated by dividing the input image 201 along a division line 203 into two semicircles, performing the processing for correcting a geometric distortion on each of the semicircles, and vertically combining the divided images. The dewarped image A 207 is an image having an origin set to an upper left vertex.

A moving object region 208 is a result of converting the central coordinates of the moving object region 204 and the coordinates of the circumscribed rectangle of the moving object region 204 in the input image 201 into central coordinates and coordinates of a circumscribed rectangle in the dewarped image A 207, and drawing them. Further, a substantially trapezoidal region indicated by a dotted line inside the moving object region 208 is a result of converting the moving object region 204 in the input image 201. Similarly, the moving object region 205 corresponds to a moving object region 209, and the moving object region 206 corresponds to a moving object region 210.

Further, in a case where the recognition result conversion unit 106 acquires the conversion instruction B, the recognition result conversion unit 106 converts the central coordinates of the human body and the coordinates of the circumscribed rectangle surrounding the human body in the dewarped image B into central coordinates of the human body and coordinates of a circumscribed rectangle surrounding the human body in the input image according to the dewarping type for generating the dewarped image B. In other words, in a case where a request for the input image is acquired from the external apparatus (the reception apparatus), the recognition result conversion unit 106 performs a conversion for causing the result of the detection processing performed on the dewarped image B (for example, the central coordinate values of the human figure) to correspond to the input image (converts the coordinate values of the human figure in the dewarped image B into the coordinate values of the human figure in the input image). A processing result generated from this conversion will be referred to as a human body processing result C.

The transmission unit 107 outputs the image, the result of the moving object processing, and the result of the human body processing to the external apparatus according to the image acquisition request received from the request acquisition unit 102. In a case where the instruction to perform the dewarping is not included in the image acquisition request acquired by the image processing apparatus from the external apparatus (the reception apparatus), the transmission unit 107 outputs the input image, the moving object processing result A, and the human body processing result C to the external apparatus. On the other hand, in a case where the instruction to perform the dewarping is included in the image acquisition request, the transmission unit 107 outputs the dewarped image A, the moving object processing result B, and the human body processing result B to the external apparatus.

Figure 4:
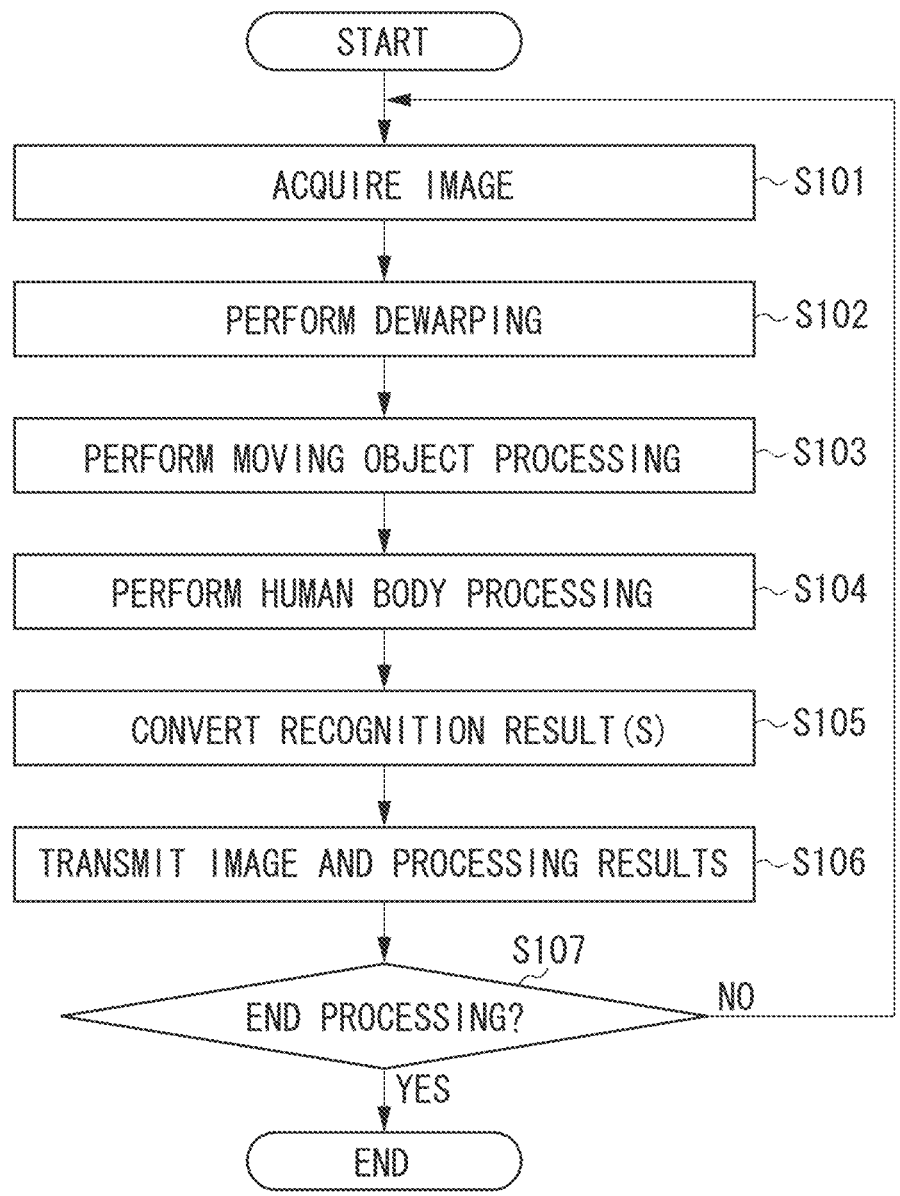
FIG. 4 is a flowchart illustrating an operation of the wide-range imaging apparatus according to the exemplary embodiment.

An operation of the image processing apparatus according to the present exemplary embodiment will be described with reference to a flowchart illustrated in FIG. 4. The image processing apparatus according to the present exemplary embodiment includes a not-illustrated central processing unit (CPU), and can execute a program for realizing the processing illustrated in FIG. 4. In other words, the image processing apparatus according to the present exemplary embodiment also includes a memory required to execute the program. However, the image processing apparatus according to the present exemplary embodiment may be configured in such a manner that each process illustrated in FIG. 4 is performed by dedicated hardware. Further, the image processing apparatus according to the present exemplary embodiment starts the processing illustrated in FIG. 4 upon detection of an instruction to start imaging. In a case where the image processing apparatus and the imaging apparatus including the fish-eye lens are separate apparatuses, the image processing apparatus starts the processing illustrated in FIG. 4 at the same time as a start of processing for acquiring an image from the imaging apparatus. However, the timing of starting the processing illustrated in FIG. 4 is not limited to the above-described timing.

In step S101, the image acquisition unit 101 acquires an image (input image). The input image according to the present exemplary embodiment is a wide-range image captured with use of the fish-eye lens, and is a circular image having a circular shape. The input image is an image unprocessed by the predetermined geometric conversion for correcting a geometric distortion due to the fish-eye lens. Further, in step S101, the request acquisition unit 102 receives an image acquisition request from the external apparatus (the reception apparatus). After the request acquisition unit 102 receives the image acquisition request, the processing proceeds to step S102.

In step S102, the dewarping unit 103 generates a dewarped image A in a case where an instruction to perform the dewarping is included in the image acquisition request provided from the request acquisition unit 102. Further, the dewarping unit 103 generates a dewarped image B (human body detection image) regardless of whether the instruction to perform the dewarping is included in the image acquisition request. Upon generation of the dewarped image(s), the processing proceeds to step S103.

In step S103, the moving object processing unit 104 performs the processing for detecting a moving object from the input image, and the processing for tracking the moving object. The processing for detecting a moving object and the processing for tracking the moving object by the moving object processing unit 104 in step S103 may be performed in parallel with the execution of the dewarping by the dewarping unit 103 in step S102. Upon completion of the processing for detecting a moving object, the processing proceeds to step S104. The moving object processing unit 104 performs the processing for detecting a moving object, and the processing for tracking the moving object on the input image on which the dewarping is not performed by the dewarping unit 103.

In step S104, the human body processing unit 105 performs the processing for detecting a human body from the dewarped image B (the human body detection image), and the processing for tracking the human body. The process of step S104 may be performed in parallel with the process of step S103. Upon completion of the processing for detecting a human body and the processing for tracking the human body by the human body processing unit 105, the processing proceeds to step S105.

In step S105, the recognition result conversion unit 106 performs the processing for converting the results of the processing performed by the moving object processing unit 104 and the processing performed by the human body processing unit 105 according to the image acquisition request acquired from the request acquisition unit 102. More specifically, in a case where the instruction to perform the dewarping is included in the image acquisition request, the recognition result conversion unit 106 performs the processing for converting the results of the processing performed by the moving object processing unit 104 and the processing performed by the human body processing unit 105. The result of the processing performed by the human body processing unit 105 (for example, the central coordinates of the human body) is the result of the processing performed on the dewarped image B (the human body detection image). Therefore, the recognition result conversion unit 106 performs the conversion processing in such a manner that the processing result corresponding to the dewarped image B becomes the processing result corresponding to the dewarped image A. In a case where the dewarped image A and the dewarped image B are the same, the recognition result conversion unit 106 does not convert the result of the processing performed by the human body processing unit 105 even if the instruction to perform the dewarping is included in the image acquisition request.

On the other hand, in a case where the instruction to perform the dewarping is not included in the image acquisition request, the recognition result conversion unit 106 does not perform the processing for converting the result of the processing performed by the moving object processing unit 104, and performs the processing for converting the result of the processing performed by the human body processing unit 105. As will be described in detail below, the present exemplary embodiment may be configured in such a manner that the image processing apparatus transmits the coordinate conversion table to the external apparatus and the external apparatus performs the conversion processing, instead of the image processing apparatus converting the processing results. In other words, in a case where the image processing apparatus transmits the dewarped image A to the external apparatus between the image processed by the predetermined geometric conversion (the dewarped image A) and the image unprocessed by the predetermined geometric conversion (the circular image), the recognition result conversion unit 106 performs control for performing the conversions according to the predetermined geometric conversion on the results of the moving object detection and the human body detection.

The processing for converting the result of the processing performed by the moving object processing unit 104 that is performed by the recognition result conversion unit 106, in a case where the instruction to perform the dewarping is included in the image acquisition request, is the conversion processing for converting the result of the processing performed on the input image (for example, the central coordinates of the moving object) into the processing result corresponding to the dewarped image A. Further, the processing for converting the result of the processing performed by the human body processing unit 105 that is performed by the recognition result conversion unit 106, in a case where the instruction to perform the dewarping is included in the image acquisition request, is the conversion processing for converting the result of the processing performed on the dewarped image B (the human body detection image) (for example, the central coordinates of the human body) into the processing result corresponding to the dewarped image A. Further, the processing for converting the result of the processing performed by the human body processing unit 105 that is performed by the recognition result conversion unit 106, in a case where the instruction to perform the dewarping is not included in the image acquisition request, is the conversion processing for converting the result of the processing performed on the dewarped image B into the processing result corresponding to the input image.

The recognition result conversion unit 106 can perform the above-described conversion processing by referring to the coordinate conversion table (coordinate conversion information) prepared in advance. Upon completion of the conversion processing by the recognition result conversion unit 106, the processing proceeds to step S106.

In step S106, the transmission unit 107 outputs the image and the processing results to the external apparatus (the reception apparatus) that is a transmission source of the image acquisition request. More specifically, in a case where the instruction to perform the dewarping is included in the image acquisition request, the transmission unit 107 transmits the dewarped image A, the moving object processing result B, and the human body processing result B to the external apparatus. On the other hand, in a case where the instruction to perform the dewarping is not included in the image acquisition request, the transmission unit 107 transmits the input image, the moving object processing result A, and the human body processing result C to the external apparatus. Upon completion of the transmission processing by the transmission unit 107, the processing proceeds to step S107. The image processing apparatus can perform the above-described respective processes for a single frame at a time, and can also perform the processes of the above-described respective steps for a plurality of frames at a time.

Then, in step S107, the image processing apparatus determines whether to continue the processing. In a case where the image processing apparatus continues the processing (NO in step S107), the processing returns to the process of step S101. On the other hand, in a case where the image processing apparatus determines to end the processing (YES in step S107), the image processing apparatus ends the processing illustrated in FIG. 4.

The image processing apparatus according to the present exemplary embodiment can acquire image acquisition requests from a plurality of external apparatuses. In a case where the image processing apparatus receives image acquisition requests different from one another from the plurality of external apparatuses, the image processing apparatus transmits the image and the processing results according to each of the image acquisition requests to the respective external apparatuses. Further, according to the present exemplary embodiment, descriptions are given for the moving object processing and the human body processing, but the processing is not limited to these kinds of processing. The image processing apparatus can perform, for example, processing for detecting, recognizing, and tracking a face and a specific object, such as a vehicle and an airplane. In such a case, the dewarping unit 103 generates the dewarped image B by performing dewarping desirable for the recognition processing.

Further, the image processing apparatus according to the present exemplary embodiment outputs the image, and the moving object processing result and the human body processing result converted so as to correspond to the image upon reception of the image acquisition request. However, the image processing apparatus may output a moving object processing result and a human body processing result that are not converted. For example, in a case where an image acquisition request containing the instruction to perform the dewarping (the request to acquire the dewarped image) is received, the image processing apparatus can also output the dewarped image A, the moving object processing result A and the moving object processing result B, and the human body processing result B and the human body processing result C. Further, in a case where the image acquisition request that does not contain the instruction to perform the dewarping (the request to acquire the circular image) is received, the image processing apparatus can also output the input image (the circular image), the moving object processing result A, and the human body processing result C.

Further, according to the present exemplary embodiment, the image processing apparatus outputs both the moving object processing result and the human body processing result upon reception of the image acquisition request. However, the image processing apparatus may output only any one of the processing results. Further, according to the present exemplary embodiment, the image processing apparatus has been described assuming that the image processing apparatus performs a request-type operation in which the image processing apparatus replies to the image acquisition request. However, the operation of the image processing apparatus is not limited to the request-type operation. The image processing apparatus may perform a push-type operation in which a specific transmission destination is preset, and the image processing apparatus transmits the image, the moving object processing result, and the human body processing result. The operation of the image processing apparatus is not limited to any specific transmission method.

As described above, the image processing apparatus converts the moving object processing result and the human body processing result to output the converted processing results according to the image acquisition request, whereby the external apparatus can efficiently acquire the image and the processing results corresponding to the image.

The present exemplary embodiment is mainly described above on the example in which the image processing apparatus converts the processing results to transmit the converted processing results according to whether the instruction to perform the dewarping is included in the image acquisition request from the external apparatus. However, for example, the processing results may be converted on the external apparatus side.

Figure 5:
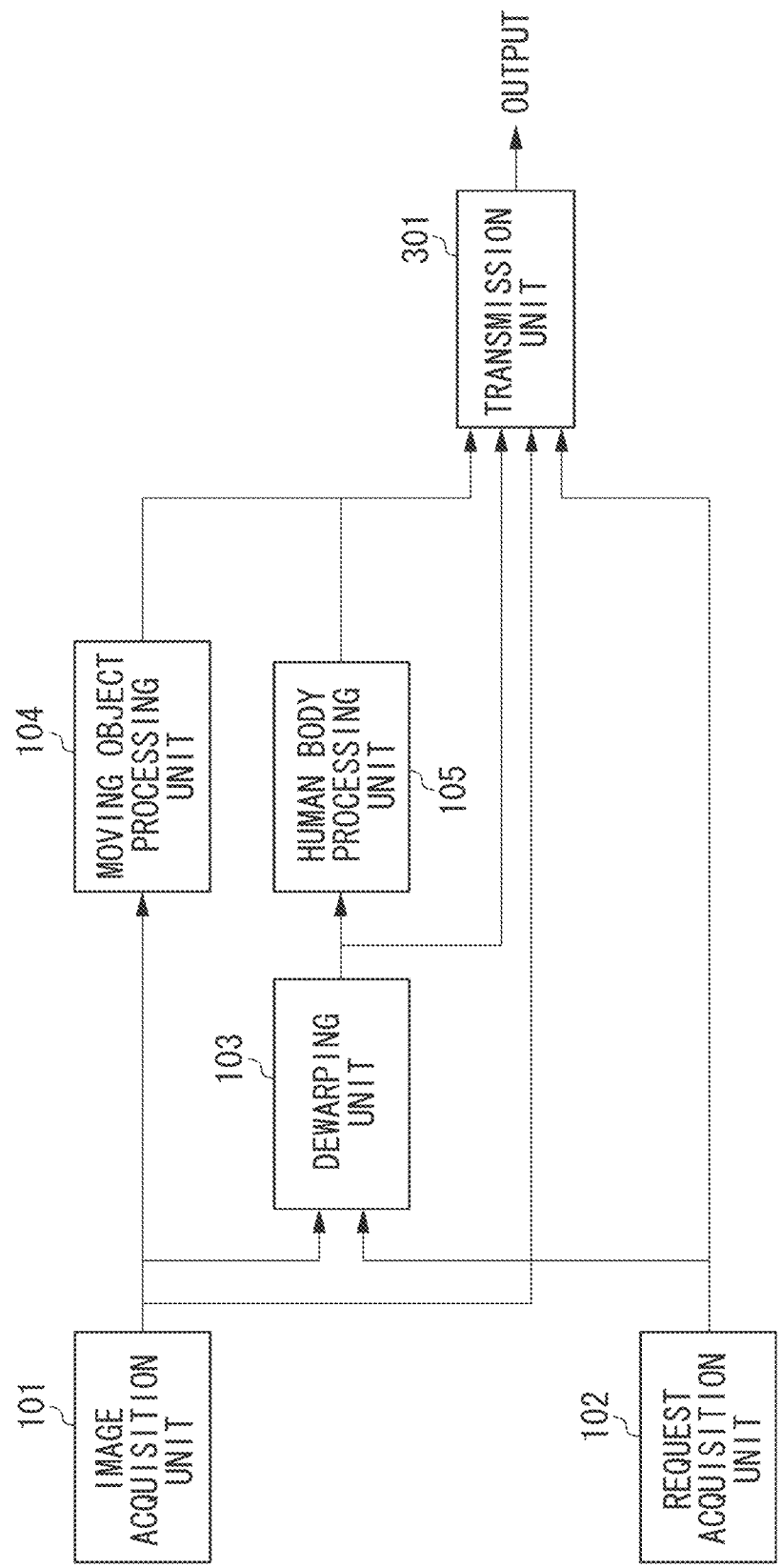
FIG. 5 is a block diagram illustrating a configuration of a wide-range imaging apparatus according to the exemplary embodiment.

FIG. 5 is a block diagram illustrating an example of a configuration of an image processing apparatus in a case where the processing results are converted on the external apparatus side. In FIG. 5, the units 101 to 105 are similar to the units illustrated in FIG. 1, whereby descriptions thereof will be omitted. However, the moving object processing unit 104 and the human body processing unit 105 transmit the results of the processing to a transmission unit 301.

The transmission unit 301 outputs the image, the result of the moving object processing, the result of the human body processing, and the coordinate conversion table (the coordinate conversion information) to the external apparatus according to the image acquisition request received from the request acquisition unit 102. More specifically, in a case where the instruction to perform the dewarping is included in the image acquisition request from the external apparatus, the transmission unit 301 transmits the dewarped image A, the moving object processing result A, the human body processing result A, and the coordinate conversion table to the external apparatus. Then, the external apparatus displays the dewarped image A acquired from the image processing apparatus, and also converts the moving object processing result A and the human body processing result A into the moving object processing result B and the human body processing result B, respectively, with use of the coordinate conversion table. Thus, the external apparatus can display the converted processing results together with the dewarped image A.

Further, for example, the image processing apparatus may be configured to transmit the input image (the circular image) to the external apparatus regardless of whether the instruction to perform the dewarping is included in the image acquisition request. In such a case, the external apparatus can acquire the dewarped image A by converting the circular image acquired from the image processing apparatus with use of the coordinate conversion table.

This configuration also allows the external apparatus to efficiently acquire the image and the processing results corresponding to the image. Further, according to the above-described configuration, in a case where the external apparatus requires acquiring the dewarped image A after acquiring the circular image, the external apparatus can generate the dewarped image A within the external apparatus without retransmitting the image acquisition request to the image processing apparatus.

A second exemplary embodiment of the present invention will be mainly described on differences from the first exemplary embodiment. According to the present exemplary embodiment, descriptions will be given for an image processing apparatus that performs image processing for removing a falling object, such as snow and rain from the wide-range image.

Figure 6:
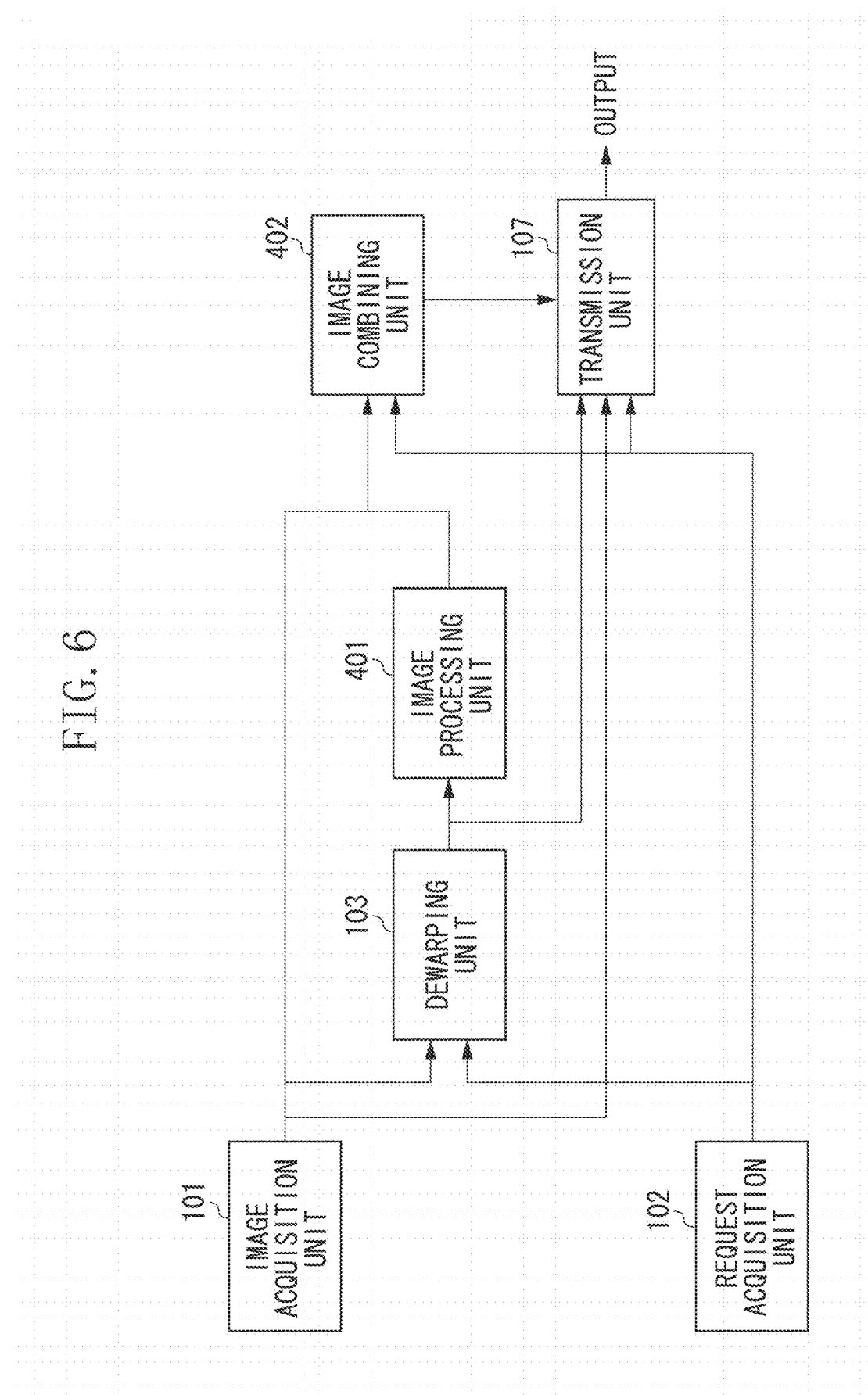
FIG. 6 is a block diagram illustrating a configuration of a wide-range imaging apparatus according to an exemplary embodiment.

FIG. 6 is a block diagram illustrating a configuration of an image processing apparatus according to the present exemplary embodiment. In FIG. 6, the units 101 to 103 and 107 are similar to the first exemplary embodiment, whereby descriptions thereof will be omitted. However, the transmission unit 107 outputs the circular image or the dewarped image according to the image acquisition request received from the request acquisition unit 102.

An image processing unit 401 performs processing for improving an image quality of a region having poor visibility due to rainfall or snowfall. For example, the image processing unit 401 performs the processing for improving the image quality on a region 502 having poor visibility due to an influence of snowfall in a dewarped image 501 illustrated in FIG. 7. More specifically, the image processing unit 401 detects a predetermined object (snow or rain) from the image (the dewarped image 501) generated by performing a predetermined geometric conversion on the input image (the circular image), and performs processing for removing the predetermined object. The predetermined geometric conversion is the conversion for correcting a geometric distortion due to the fish-eye lens. This conversion can be realized by, for example, referring to the coordinate correspondence table as illustrated in FIG. 2.

The image processing unit 401 according to the present exemplary embodiment can improve the image quality by locating the region of the rain or the snow based on, for example, information about a size, a number, a color, a motion speed, a motion direction, and the like of the object detected from the dewarped image 501, and by employing filtering processing, such as smoothing filtering processing, on the located region. However, the processing for improving the image quality is not limited to the above-described processing.

An image combining unit 402 geometrically reconverts the region with its image quality improved by the image processing unit 401, and combines the reconverted region to the input image (the circular image). More specifically, the image combining unit 402 performs a reverse geometric conversion of the predetermined geometric conversion (the geometric conversion for acquiring the dewarped image from the input image) on the image with the predetermined object (the snow or the rain) removed therefrom. Then, the transmission unit 107 transmits the image after the reverse geometric conversion to the external apparatus.

Figure 7:
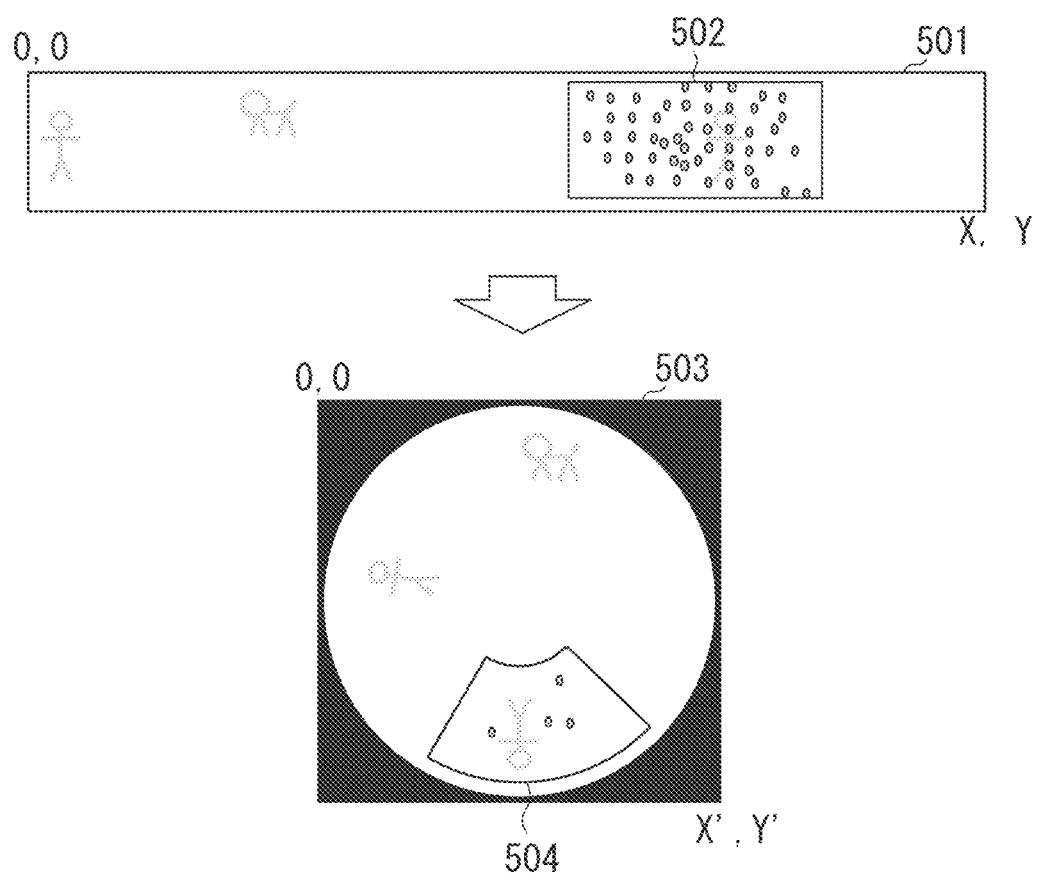
FIG. 7 is a diagram illustrating an example of image processing.

The image processing apparatus according to the present exemplary embodiment, for example, generates the dewarped image corresponding to the region 502 in the dewarped image 501 by performing the predetermined geometric conversion on a region 504 in a circular image 503 illustrated in FIG. 7, and performs the processing for improving the image quality on the region 502. Then, the image combining unit 402 of the image processing apparatus returns the region 502 to the shape of the region 504 by performing the reverse geometric conversion of the predetermined geometric conversion on the region 502 processed by the processing for improving the image quality, and combines this region 504 to the circular image 503. As a result, the circular image with its image quality improved can be acquired. The method for the geometric conversion is similar to the method employed in the first exemplary embodiment.

It is effective to perform the geometric conversion on the circular image in a case where the specific processing for improving the image quality (for example, the processing for removing snowfall) is performed, as in the present exemplary embodiment. This is because a movement direction is largely different for each flake of snow or each drop of rain in the circular image but the difference in the movement direction can be reduced by the geometric conversion. Then, after the image processing unit 401 employs the processing for improving the image quality, the image combining unit 402 can combine the improved region to the circular image without any problem by performing the geometric conversion on the dewarped image again.

An operation of the image processing apparatus according to the present exemplary embodiment will be described with reference to FIG. 4. In step S101, the image acquisition unit 101 acquires the input image, and the request acquisition unit 102 also acquires the image acquisition request. In step S102, the dewarping unit 103 performs the processing for dewarping the input image. Then, in step S103, the image processing unit 401 performs the processing for improving the image quality (for example, the processing for removing the snow or the rain) on the dewarped image. More specifically, the image processing unit 401 detects the snow or the rain, and performs the processing for removing the detected snow or rain. Step S104 is not performed in the present exemplary embodiment, but the present exemplary embodiment may be configured in such a manner that step S104 is performed.

In step S105, in a case where the instruction to perform the dewarping is not included in the image acquisition request from the external apparatus, the image combining unit 402 generates the circular image by performing the reverse geometric conversion processing on the dewarped image processed by the processing for improving the image quality. On the other hand, in a case where the instruction to perform the dewarping is included in the image acquisition request from the external apparatus, the image combining unit 402 does not perform the reverse geometric conversion processing. In step S106, the transmission unit 107 transmits the image according to the image acquisition request from the external apparatus, to the external apparatus.

According to the configuration of the present exemplary embodiment, a reception apparatus becomes able to acquire an appropriate combination of an image and a processing result corresponding to the image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-092540 filed Apr. 28, 2014, which is hereby incorporated by reference herein in its entirety.

What is claimed is:

1. An image processing apparatus comprising:
   at least one processor; and
   at least one memory for storing instructions to be executed by the at least one processor,
   wherein when the instructions stored in the at least one memory are executed by the at least one processor, the at least one processor functions as:
   a processing unit configured to perform predetermined detection processing on captured image data obtained by using an imaging unit for wide-angle imaging;
   a receiving unit configured to receive, from a receiving apparatus, at least one of a first request for requesting converted image data which is obtained by performing a geometric conversion on the captured image data and a second request for requesting non-converted image data which is captured image data on which the geometric conversion has not been performed;
   a conversion unit configured to perform conversion processing according to the geometric conversion on positional information obtained by performing the predetermined detection processing on the captured image data on which the geometric conversion has not been performed; and
   a transmitting unit configured to transmit to the receiving apparatus:
   (i) the converted image data which is obtained by performing the geometric conversion on the captured image data and converted positional information which is obtained by performing the conversion processing on the positional information in a case where the receiving unit receives from the receiving apparatus the first request for the converted image data, and
   (ii) the non-converted image data which is captured image data on which the geometric conversion has not been performed and non-converted positional information which is positional information on which the conversion processing has not been performed by the conversion unit in a case where the receiving unit receives from the receiving apparatus the second request for the non-converted image data.

2. The image processing apparatus according to claim 1, wherein the processing unit is configured to acquire the positional information of a moving object and at least one of area information of the moving object and a circumscribed rectangle information of the moving object, by performing the predetermined detection processing, and
   wherein the conversion unit is configured to perform the conversion processing according to the geometric conversion on the positional information of the moving object and on the at least one of the area of the moving object and the circumscribed rectangle information of the moving object in a case where the receiving unit receives the first request for requesting the converted image data.

3. The image processing apparatus according to claim 1, wherein the at least one processor functions as:
   a human body detection unit configured to acquire human body information including at least one of positional information of a human body, area information of the human body, and circumscribed rectangle information of the human body, by performing human body detection processing on the converted image data which is obtained by performing the geometric conversion on the captured image data, and
   wherein the conversion unit is configured to perform second conversion processing according to the geometric conversion on the human body information in a case where the receiving unit receives from the receiving apparatus the second request for the non-converted image data.

4. The image processing apparatus according to claim 3, wherein the conversion unit is configured to perform, the second conversion processing corresponding to a reverse conversion of the geometric conversion on the human body information acquired by the human body detection unit.

5. The image processing apparatus according to claim 1, wherein the at least one processor functions as:
   a removal unit configured to detect a predetermined object from the converted image data and perform removal processing for removing the predetermined object from the converted image data,
   wherein the conversion unit is configured to perform conversion processing corresponding to a reverse conversion of the geometric conversion on the converted image data from which the predetermined object has been removed by the removal unit, and image data processed by the conversion processing corresponding to the reverse conversion is transmitted to the reception apparatus, in a case where the receiving unit receives the second request for the non-converted image data.

6. The image processing apparatus according to claim 1, wherein the at least one processor functions as:
   a second processing unit configured to perform second detection processing on the image data,
   wherein the conversion unit is configured to perform a conversion corresponding to a reverse conversion of the geometric conversion on a result of the second detection processing performed on the captured image data, in a case where the receiving unit receives the second request for the non-converted image data.

7. An image processing method comprising:
   performing predetermined detection processing on captured image data obtained by using an imaging unit for wide-angle imaging;
   receiving, from a receiving apparatus, at least one of a first request for requesting converted image data which is obtained by performing a geometric conversion on the captured image data and a second request for requesting non-converted image data which is captured image data on which the geometric conversion has not been performed;
   performing conversion processing according to the geometric conversion on positional information obtained by performing the predetermined detection processing on the captured image data on which the geometric conversion has not been performed; and
   transmitting to the receiving apparatus:

(i) the converted image data which is obtained by performing the geometric conversion on the captured image data and converted positional information which is obtained by performing the conversion processing on the positional information in a case where the receiving receives from the receiving apparatus the first request for the converted image data, and (ii) the non-converted image data which is captured image data on which the geometric conversion has not been performed and non-converted positional information which is positional information on which the conversion processing has not been performed by the performing conversion processing in a case where the receiving receives from the receiving apparatus the second request for the non-converted image data.

8. A non-transitory computer-readable storage medium storing a program for causing a computer to execute a method comprising:

performing predetermined detection processing on captured image data obtained by using an imaging unit for wide-angle imaging;

receiving, from a receiving apparatus, at least one of a first request for requesting converted image data which is obtained by performing a geometric conversion on the captured image data and a second request for requesting non-converted image data which is captured image data on which the geometric conversion has not been performed;

performing conversion processing according to the geometric conversion on positional information obtained by performing the predetermined detection processing on the captured image data on which the geometric conversion has not been performed; and transmitting to the receiving apparatus:

(i) the converted image data which is obtained by performing the geometric conversion on the captured image data and converted positional information which is obtained by performing the conversion processing on the positional information in a case where the receiving receives from the receiving apparatus the first request for the converted image data, and (ii) the non-converted image data which is captured image data on which the geometric conversion has not been performed and non-converted positional information which is positional information on which the conversion processing has not been performed by the performing conversion processing in a case where the receiving receives from the receiving apparatus the second request for the non-converted image data.

9. An image processing apparatus comprising:

at least one processor; and at least one memory for storing instructions to be executed by the at least one processor, wherein when the instructions stored in the at least one memory are executed by the at least one processor, the at least one processor functions as:

a processing unit configured to perform predetermined detection processing on captured image data obtained by using an imaging unit for wide-angle imaging;

a receiving unit configured to receive, from a receiving apparatus, at least one of a first request for requesting converted image data which is obtained by performing a geometric conversion on the captured image data and a second request for requesting non-converted image data which is captured image data on which the geometric conversion has not been performed;

an acquiring unit configured to acquire a conversion parameter being usable by the receiving apparatus to perform conversion processing according to the geometric conversion on positional information obtained by performing the predetermined detection processing on the captured image data on which the geometric conversion has not been performed; and a transmitting unit configured to transmit to the receiving apparatus:

(i) the converted image data which is obtained by performing the geometric conversion on the captured image data, the positional information obtained by the predetermined processing on the captured image data, and the conversion parameter being usable by the receiving apparatus to perform the conversion processing according to the geometric conversion on the positional information in a case where the receiving unit receives from the receiving apparatus the first request for the converted image data, and (ii) the non-converted image data which is captured image data on which the geometric conversion has not been performed and the positional information in a case where the receiving unit receives from the receiving apparatus the second request for the non-converted image data.

10. An image processing apparatus comprising:

at least one processor; and at least one memory for storing instructions to be executed by the at least one processor, wherein when the instructions stored in the at least one memory are executed by the at least one processor, the at least one processor functions as:

a processing unit configured to perform predetermined detection processing on converted image data which is obtained by performing a geometric conversion on captured image data obtained by using an imaging unit for wide-angle imaging;

a receiving unit configured to receive, from a receiving apparatus, at least one of a first request for requesting converted image data which is obtained by performing a geometric conversion on the captured image data and a second request for requesting non-converted image data which is captured image data on which the geometric conversion has not been performed;

a conversion unit configured to perform conversion processing corresponding to a reverse conversion of the geometric conversion on positional information obtained by performing the predetermined detection processing on the converted image data which is obtained by performing the geometric conversion on the captured image data; and a transmitting unit configured to transmit to the receiving apparatus:

(i) the converted image data which is obtained by performing the geometric conversion on the captured image data and the positional information which is obtained by the predetermined detection processing on the converted image data in a case where the receiving unit receives from the receiving apparatus the first request for the converted image data, and (ii) the non-converted image data which is captured image data on which the geometric conversion has not been performed and the converted positional information which is obtained by performing the conversion processing corresponding to the reverse conversion of the geometric conversion on the positional information in a case where the receiving unit receives from the receiving apparatus the second request for the non-converted image data.

11. An image processing method comprising:
performing predetermined detection processing on captured image data obtained by using an imaging unit for wide-angle imaging;
receiving, from a receiving apparatus, at least one of a first request for requesting converted image data which is obtained by performing a geometric conversion on the captured image data and a second request for requesting non-converted image data which is captured image data on which the geometric conversion has not been performed;
acquiring a conversion parameter being usable by the receiving apparatus to perform conversion processing according to the geometric conversion on positional information obtained by performing the predetermined detection processing on the captured image data on which the geometric conversion has not been performed; and
transmitting to the receiving apparatus:
(i) the converted image data which is obtained by performing the geometric conversion on the captured image data, the positional information obtained by the predetermined processing on the captured image data, and the conversion parameter being usable by the receiving apparatus to perform the conversion processing according to the geometric conversion on the positional information in a case where the receiving receives from the receiving apparatus the first request for the converted image data, and
(ii) the non-converted image data which is captured image data on which the geometric conversion has not been performed and the positional information in a case where the receiving receives from the receiving apparatus the second request for the non-converted image data.

12. An image processing method comprising:
performing predetermined detection processing on converted image data which is obtained by performing a geometric conversion on captured image data obtained by using an imaging unit for wide-angle imaging;
receiving, from a receiving apparatus, at least one of a first request for requesting converted image data which is obtained by performing a geometric conversion on the captured image data and a second request for requesting non-converted image data which is captured image data on which the geometric conversion has not been performed;
performing conversion processing corresponding to a reverse conversion of the geometric conversion on positional information obtained by performing the predetermined detection processing on the converted image data which is obtained by performing the geometric conversion on the captured image data; and
transmitting to the receiving apparatus:
(i) the converted image data which is obtained by performing the geometric conversion on the captured image data and the positional information which is obtained by the predetermined detection processing on the converted image data in a case where the receiving receives from the receiving apparatus the first request for the converted image data, and
(ii) the non-converted image data which is captured image data on which the geometric conversion has not been performed and the converted positional information which is obtained by performing the conversion processing corresponding to the reverse conversion of the geometric conversion on the positional information in a case where the receiving receives from the receiving apparatus the second request for the non-converted image data.

13. A non-transitory computer-readable storage medium storing a program for causing a computer to execute a method comprising:
performing predetermined detection processing on captured image data obtained by using an imaging unit for wide-angle imaging;
receiving, from a receiving apparatus, at least one of a first request for requesting converted image data which is obtained by performing a geometric conversion on the captured image data and a second request for requesting non-converted image data which is captured image data on which the geometric conversion has not been performed;
acquiring a conversion parameter being usable by the receiving apparatus to perform conversion processing according to the geometric conversion on positional information obtained by performing the predetermined detection processing on the captured image data on which the geometric conversion has not been performed; and
transmitting to the receiving apparatus:
(i) the converted image data which is obtained by performing the geometric conversion on the captured image data, the positional information obtained by the predetermined processing on the captured image data, and the conversion parameter being usable by the receiving apparatus to perform the conversion processing according to the geometric conversion on the positional information in a case where the receiving receives from the receiving apparatus the first request for the converted image data, and
(ii) the non-converted image data which is captured image data on which the geometric conversion has not been performed and the positional information in a case where the receiving receives from the receiving apparatus the second request for the non-converted image data.

14. A non-transitory computer-readable storage medium storing a program for causing a computer to execute a method comprising:
performing predetermined detection processing on converted image data which is obtained by performing a geometric conversion on captured image data obtained by using an imaging unit for wide-angle imaging;
receiving, from a receiving apparatus, at least one of a first request for requesting converted image data which is obtained by performing a geometric conversion on the captured image data and a second request for requesting non-converted image data which is captured image data on which the geometric conversion has not been performed;
performing conversion processing corresponding to a reverse conversion of the geometric conversion on positional information obtained by performing the predetermined detection processing on the converted image data which is obtained by performing the geometric conversion on the captured image data; and
transmitting to the receiving apparatus:

(i) the converted image data which is obtained by performing the geometric conversion on the captured image data and the positional information which is obtained by the predetermined detection processing on the converted image data in a case where the receiving receives from the receiving apparatus the first request for the converted image data, and (ii) the non-converted image data which is captured image data on which the geometric conversion has not been performed and the converted positional information which is obtained by performing the conversion processing corresponding to the reverse conversion of the geometric conversion on the positional information in a case where the receiving receives from the receiving apparatus the second request for the non-converted image data.

* * * * *